United States Patent [19]
Kagami et al.

[11] Patent Number: 5,339,299
[45] Date of Patent: Aug. 16, 1994

[54] OPTICAL DISK DRIVE APPARATUS FOR SEARCHING A TARGET TRACK

[75] Inventors: Naoyuki Kagami, Fujisawa; Hiroaki Kubo, Oomihachiman, both of Japan

[73] Assignee: International Business Machines Corporation, Armonk, N.Y.

[21] Appl. No.: 978,604

[22] Filed: Nov. 19, 1992

[30] Foreign Application Priority Data

Dec. 25, 1991 [JP] Japan .................. 3-343335

[51] Int. Cl.$^5$ .............................. G11B 17/22
[52] U.S. Cl. .................. 369/32; 369/44.28; 369/33
[58] Field of Search ............ 369/32, 33, 44.28, 44.27, 369/44.29; 360/77.02, 78.05

[56] References Cited

U.S. PATENT DOCUMENTS

| | | | |
|---|---|---|---|
| 4,866,687 | 9/1989 | Kasai et al. | 369/32 |
| 4,901,299 | 2/1990 | Nakatsu | 369/32 |
| 4,926,405 | 5/1990 | Hangai et al. | 369/32 |
| 5,228,019 | 7/1993 | Yanagi | 369/32 |

*Primary Examiner*—Robert J. Pascal
*Assistant Examiner*—Tan Dinh

[57] ABSTRACT

The present invention provides an optical disk drive apparatus, and a method for driving the same, which makes the most of the ability of acceleration and deceleration in an actuator in a simple system configuration to realize fast seek operation of high reliability. An optical disk drive apparatus according to the present invention provides the means for determining whether the number of tracks from a current track to a target track is smaller than the predetermined number and the means for driving the fine actuator in the tracking direction under the velocity control based on a tracking error signal if the number of tracks from the current track to the target track is smaller than the predetermined number.

13 Claims, 7 Drawing Sheets

OPTICAL DISK DRIVE APPARATUS FOR SEARCHING A TARGET TRACK

FIELD OF THE INVENTION

The present invention relates to an optical disk drive apparatus, and more particularly to a method and an apparatus for achieving seek operations of high reliability at high speed.

BACKGROUND OF THE INVENTION

In an optical disk drive apparatus, a seek operation for moving an optical head (and therefore a laser beam) from a current position (or a current track) to a target position (or a target track) across intermediate tracks is performed initially by a coarse seek operation in which the optical head is moved under the direction of a linear position sensor to the neighborhood of the target track at a high velocity. The coarse seek operation is followed with a fine seek operation in which the optical head is moved across remaining tracks one at a time to the target track at a velocity on the order of milliseconds per track. However, this method requires substantial time for the fine seek operation and it becomes difficult to decrease the total seek time. For the above reason, methods of a seek operation performed responsive only to a tracking error signal ("TES") without the linear position sensor have been developed. The chief methods of the seek operation performed by using only the TES are as follows:

FIG. 5 shows a block diagram of an optical disk drive apparatus using a first conventional method. In FIG. 5, the focus control of a beam spot 23 applied to the surface of an optical disk 5 can be performed as follows:

A focusing error signal (FES) sensor 6 detects a focus error and generates a focus error signal. Based on the FES, a focus servo controller 9, a focus voice coil motor ("VCM") driver 10, and a focus actuator 2 perform the position control of an objective lens 24 in the focusing direction so that a focal point of the objective lens 24 remains on the surface of the optical disk.

With respect to the position control of the beam spot 23 in the tracking direction ( that is, in the radial direction ) of the optical disk, the track following operation and the seek operation are separately described. First, in the track following operation, a switcher 11 is switched, by a signal on a seek/track following control line 30 carrying output from a microprocessor and logic 22, to receive an output of a tracking error signal sensor 7 which detects a position of the beam spot 23 relative to a track groove on the optical disk 5 and generates a TES. In response to the TES, a fine servo controller 12, a fine actuator VCM driver 13, and a fine actuator 3 drive the objective lens 24 in the tracking direction so that the position of the beam spot 23 relative to the track groove on the optical disk 5 becomes zero. The beam spot 23 is thus positioned on a current track. Then, a position of the objective lens 24 relative to an optical head 1 is detected by a lens position sensor 8 to generate a relative position error signal; a coarse servo controller 14, a coarse actuator VCM driver 16, and a coarse actuator 4 perform the position control of the optical head 1 in the tracking direction so that the relative position error ("RPE") signal (also called lens position error signal) becomes zero. In this case, a switcher 15 is switched, by a signal on the seek/track following control line 30, to receive an output of the coarse servo controller 14. Thus, the beam spot 23 is positioned on a current track and a position of the optical head 1 is controlled so that the RPE signal becomes zero and the head follows the objective lens 24.

In a seek operation in which the beam spot 23 moves from a current track to a target track, the microprocessor and logic 22 presets a track counter 21 with the number of tracks from the current track to the target track. The seek/track following control line 30 is set to the seek state, the switcher 11 is switched to receive the RPE, and the switcher 15 is switched to receive an output of a velocity comparator 19. Since the switcher 11 is switched to receive the RPE, the objective lens 24 is controlled by the fine servo controller 12, the fine actuator VCM driver 13, and the fine actuator 3 so that a position error of the objective lens 24 relative to the optical head 1 becomes zero. A track crossing signal is generated each time the beam spot 23 crosses a track groove on the optical disk 5 and is detected by a track crossing detecting circuit 20. As the track crossing signals are detected by the track crossing detecting circuit 20, the track counter 21 counts down from its preset value. The contents of the track counter 21 are outputted to a reference velocity generating circuit 18 and which outputs a reference velocity for the remaining tracks to the velocity comparator 19. Simultaneously, a TES is converted by a laser beam track crossing velocity detecting circuit 17 to a signal representative of a velocity of movement of the beam spot 23. The velocity signal outputted from the laser beam track crossing velocity detecting circuit 17 to the velocity comparator 19 where it is compared with the reference velocity from the reference velocity generating circuit 18. A velocity error signal is outputted. Since the switcher 15 is switched to receive the output of the velocity comparator 19, the coarse actuator 4 is driven based on the velocity error signal and the coarse actuator VCM driver, and velocity control is performed so that the velocity of the beam spot 23 follows a reference velocity. When the beam spot 23 reaches the target track, the microprocessor and logic 22 switches the seek/track following control line 30 to the track following state in which the beam spot is under position control.

An example of the laser beam track crossing velocity detecting circuit and exemplary waveforms are shown by FIG. 6 and FIG. 7. The velocity detecting circuit is a frequency/voltage converter. As shown in FIG. 6, the zero crossings of a TES (a) are converted to binary form (b). The binary output is converted, by a monostable multivibrator, to a series of pulses having a constant width interval (c); low-pass filtering is applied to the pulses to obtain velocity information (d). In another method, shown in FIG. 7, the pulse durations of binary output (b) are counted by using a counter (e) and thus obtains velocity information (f) is obtained.

FIG. 8 is a block diagram showing a optical disk drive apparatus using a second conventional method. The focus control of the beam spot 23 irradiating the surface of the optical disk 5 is performed by the FES sensor 6, the focus servo controller 9, the focus VCM driver 10, and the focus actuator 2 in the same way as the first conventional method described above. The track following operation of the beam spot 23 and the position control of the optical head 1 are also performed in the same way as the first conventional method. That is, a switcher 101 is switched to receive the TES and the track following control of the beam spot is performed, based on the TES, by the TES sensor 7, the fine servo controller 12, the fine actuator VCM driver 13, and the fine actuator 3; the position control of the optical head 1 is performed, based on an RPE signal, by the lens position sensor 8, the coarse servo controller 14, the coarse actuator VCM driver 16, and the coarse actuator 4.

In the seek operation in which the beam spot 23 moves from a current track to a target track, the microprocessor and logic 22 presets a track counter 21 with the number of tracks from the current track to the target track. The seek/track following control line 30 is set to transmit the seek state and the switcher 101 is switched to receive a position error signal ("PES") from an integrator 105. A track crossing signal is generated each time the beam spot 23 crosses a track groove on the optical disk 5 and is detected by the track crossing signal detecting circuit 20. As the track crossing signals are detected by the track crossing detecting circuit 20, the track counter 21 counts down from its preset value. The contents of the track counter 21 are outputted to the reference velocity generating circuit 18 which outputs a reference velocity for the remaining tracks to a velocity comparator 104. Simultaneously, a TES is converted, by a differentiator 102 and a rectifier 103, to a differential tracking position signal representative of a velocity of movement of the beam spot 23. This signal is compared with the reference velocity by the velocity comparator 104. The output of the velocity comparator 104 is integrated by the integrator 105 and outputted as a position error signal. The fine actuator 3 is driven, based on the PES, by the fine servo controller 12 and the fine actuator VCM driver 13, and velocity control is performed so that the velocity of the beam spot 23 follows a reference velocity. The optical head 1 moves in such a way that it follows the positions of the objective lens 24 so that a lens position error becomes zero, as described above. When the beam spot 23 reaches the target track, the microprocessor and logic 22 switches the seek/track following control line 30 to the track following state and the beam spot is placed under position control.

In the following, the operations of the differentiator 102, the rectifier 103, the velocity comparator 104 and the integrator 105 are described by reference to the waveforms illustrated in FIG. 9. A TES is converted, by the differentiator 102 and the rectifier 103, to a differential tracking position signal representative of the velocity movement of the beam spot 23 and compared with a reference velocity associated with the number of remaining tracks by the velocity comparator 104. The output of the velocity comparator 104 is processed by the integrator 105 and outputted as a position error signal (PES). Since the velocity of the beam spot 23 is low immediately after the seek operation is started, a PES having a large amplitude is inputted to the fine servo controller 12 to accelerate the fine actuator 3. If a significantly low reference velocity is provided when the head is in the neighborhood of a target track, indicating that the velocity of the beam spot reaches has approached a track following controllable velocity, the velocity control is performed even before a target track center is reached, and therefore control for positioning on a target track can be exactly performed.

The first method of the prior art has been generally employed with a magnetic disk drive apparatus. However, the method cannot set a sufficiently high controllable frequency of the coarse actuator 4 in a optical disk drive apparatus which has a larger and heavier head than that of a magnetic disk drive apparatus. Therefore, the velocity of the coarse actuator 4 cannot be precisely controlled when the beam spot 23 is in the neighborhood of a target track and an attempt to shift to the track following control fails.

Frequencies of a TES range from 1 kHz to hundreds of kilohertz in the seek operation and it is desirable to increase the frequency range of operation of the laser beam track crossing velocity detecting circuit in order to realize high-speed track access. And, in some cases it is necessary to switch among controlling circuits with plural bandwidths which increases circuit complexity. Further, the method for detecting a velocity described in the first method detects the velocity only after the crossing a track, and therefore the velocity control would become delayed immediately before a target track.

The second method of seek control can provide much the same control as is provided by the tracking control when the beam spot 23 is in the neighborhood of the target track, since the fine actuator 3 is primarily controlled by a PES corresponding to a position error. Therefore, fine velocity control and position control become possible and reliable shifting to the track following control is realizable. However, in the second method, the fine actuator 3 is primarily controlled and the seek operation is secondarily controlled in such a way that the coarse actuator 4 controlled by an RPE signal is under the following operation. Therefore, the acceleration and deceleration of the coarse actuator 4 are delayed and it becomes difficult to make the most of the ability of acceleration or deceleration in the coarse actuator 4. Further, in the second method, as in the first method, frequencies of the TES range from 1 kHz to hundreds of kilohertz during the seek operation, and therefore it is necessary to increase the frequency range of operation of the differentiator 102 and the rectifier 103 in order to realize high-speed track access. In some cases it is necessary to switch among controlling circuits with plural bandwidths, which increases the circuit complexity.

OBJECTS AND SUMMARY OF THE INVENTION

Accordingly, objects of the present invention are to overcome the above problems in the prior art, to make the most of the ability of acceleration and deceleration in an actuator in accordance with simple system configuration, and to realize fast seek operation of high reliability.

To attain said objects, the present invention provides an optical disk drive apparatus having a coarse actuator for driving an optical head, a fine actuator for driving an objective lens on the optical head, tracking error detecting means for generating a tracking error signal indicating a positional difference between the position of an optical spot irradiated on an optical disk and a target track, and a track counter for counting the number of tracks from a current track to a target tracks. The apparatus further provides means for indicating whether the number of tracks from a current track to a target track is smaller than a predetermined number of tracks. Only if the number of tracks from a current track from the target track is smaller than the predetermined number of tracks will the fine actuator be driven in the tracking direction under the velocity control based on the tracking error signal.

In another embodiment, the present invention provides an optical disk drive apparatus having a coarse actuator for driving an optical head, a fine actuator for driving an objective lens on the optical head, and tracking error detecting means for generating a tracking error signal indicating a positional difference between the location of an optical spot irradiated on an optical disk and a target track. The apparatus further provides switching means for outputting a switching signal when a frequency of the tracking error signal becomes smaller than a predetermined value during deceleration of the optical head. The fine actuator is driven, in response to the switching signal from the switching means, in the tracking direction under the velocity control based on the tracking error signal.

In another embodiment, the present invention provides an optical disk drive apparatus having a coarse actuator for driving an optical head, a fine actuator for driving an objective lens on the optical head, and tracking error detecting means for generating a tracking errors signal indicating a positional difference between the location of an optical spot irradiated on an optical disk and a target track. The apparatus further provides switching means for outputting a switching signal when a velocity of the optical had becomes smaller than a predetermined value during deceleration of the optical head. The fine actuator is driven, in response to the switching signal from the switching means, in the tracking direction under the velocity control based on the tracking error signal.

As described above, the present invention provides an advantage in that a microprocessor can directly control the acceleration or deceleration of the optical head during a long seek operation (seeking across a number of tracks greater than the predetermined number) to perform a fast seek to the utmost limit of power of the coarse actuator and can switch to the velocity control by the fine actuator using the TES after the optical head slows down immediately before the target track is reached so that the high reliability track following operation can then be performed. Further, the present invention provides another advantage in that, since the control of the optical head is performed by using a position signal from the track counter while a beam spot moves at a high speed, a wide bandwidth controlled differentiator and integrator or a velocity detecting circuit, which the prior art methods need, are not needed.

DETAILED DESCRIPTION

Figure 1:
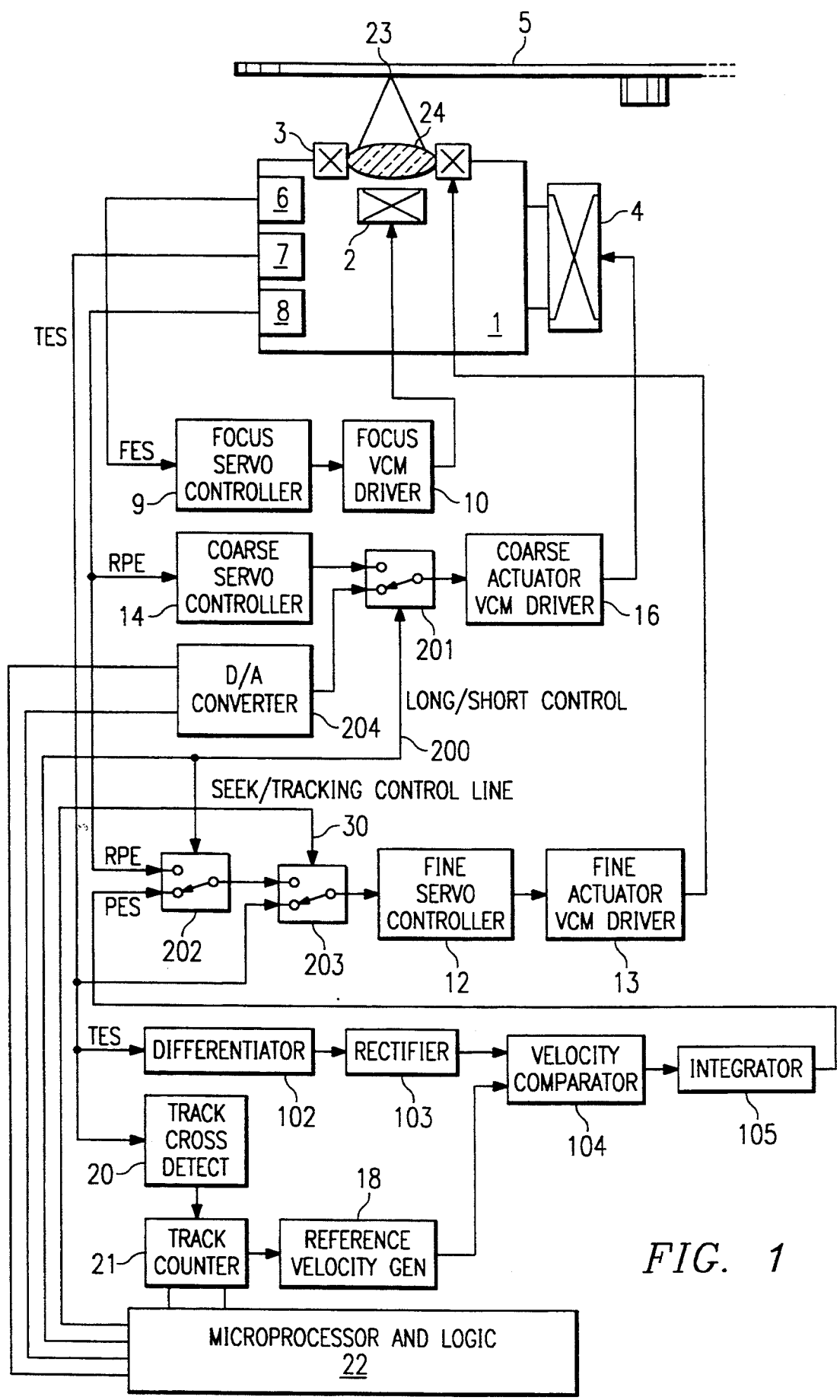
FIG. 1 is a diagram showing an embodiment of the present invention.

FIG. 1 shows an embodiment of an optical disk drive apparatus according to the present invention. The focus control of the beam spot 23 irradiated on the surface of the optical disk 5 is as follows:

The FES sensor 6 detects an focus error to generate a focus error signal. Based on the focus error signal, the focus servo controller 9, the focus VCM driver 10, and the focus actuator 2 perform the position control of the objective lens 24 in the focusing direction, and thereby the focus control is performed so that the objective lens 24 is focused on the surface of the optical disk.

With respect to the position control of the beam spot 23 in the radial direction of the optical disk, the track following operation and the seek operation are separately described. First, in the track following operation, a switcher 203 is switched, by the seek/track following control line 30 carrying output from the microprocessor and logic 22, to receive the output (TES) of the TES sensor 7 which detects the position of the beam spot 23 relative to a track groove on the optical disk 5 and generates a TES. Based on the TES, the fine servo controller 12, the fine actuator VCM driver 13, and the fine actuator 3 drive the objective lens 24 in the tracking direction so that the position of the beam spot 23 relative to a track groove on the optical disk 5 becomes zero. The beam spot 23 is thus positioned in a current track.

Additionally in the track following operation, a switcher 201 is switched, by the long/short seek control line 200 (described later), to receive the output of the coarse servo controller 14. The position of the objective lens 24 relative to the optical head 1 is detected by the lens position sensor 8 which generates an RPE signal, and the coarse servo controller 14, the coarse actuator VCM driver 16, and the coarse actuator 4 perform the position control of the optical head 1 in the tracking direction so that the RPE signal becomes zero. Thus, the beam spot 23 is positioned in the current track and the position of the optical head 1 is controlled in such a manner that it follows a position of the objective lens 24 as the lens position error becomes zero.

In the seek operation for moving the beam spot 23 from a current track to a target track under position control, the microprocessor and logic 22 presets the track counter 21 with the number of tracks corresponding to the distance from a current track to a target track. During the seek operation, a track crossing signal is generated when the beam spot 23 crosses a track groove on the optical disk 5 and is detected by the track crossing detecting circuit 20. Based on the track crossing signal detected by the track crossing detecting circuit 20, the track counter 21 counts down and the track counter 21 contains the number of tracks remaining to be encountered until the target track is reached.

The microprocessor and logic 22 can read the contents of the track counter 21. According to the present invention, during a long seek operation (across a greater number of tracks than the predetermined number), the microprocessor and logic 22 sets the long/short seek control line 200 to the long seek state. The predetermined number of tracks can be determined in relation to the operating frequencies, a frequency of a TES, etc. of various electric circuits used for the optical disk drive apparatus. A predetermined number ranging from about 50 to about 100 tracks has been found to be adequate; however, the present invention is not limited to such a range.

The long/short seek control line 200 is connected to the switcher 202. In the long seek state, the switcher 202 is switched to receive the RPE output from the lens position sensor 8. Based on the RPE signal, the objective lens 24 is controlled by the fine servo controller 12, the fine actuator VCM driver 13 and the fine tracking actuator 3 so that a position error of the objective lens 24 to the optical head 1 becomes zero. The long/short seek control line 200 is connected also to the switcher 201. In the long seek state, the switcher 201 is switched to receive the output of a digital-to-analog converter (D/A converter) 204 connected to the microprocessor and logic 22. The microprocessor and logic 22 calculates a drive current of the coarse actuator 4 based on the contents of the track counter 21, according to a method of calculation described later, and outputs the result to the D/A converter 204. Based on output from the D/A converter 204, the coarse actuator VCM drive 16 and the coarse actuator 4 control the movement of the optical head 1.

The microprocessor and logic 22 continuously monitors the contents of the track counter 21 and sets the long/short seek control line 200 to the short seek state when the number of remaining tracks is smaller than the predetermined number of tracks. In the short seek state, the switchers 201 and 202 are switched to receive the outputs of the coarse servo controller 14 and the integrator 105, respectively. Subsequently, the content of the track counter 21 is outputted to the reference velocity generating circuit and a reference velocity associated with the number of remaining tracks is outputted to the velocity comparator 104. The TES is also converted, through the differentiator 102 and the rectifier 103, to a differential tracking position representative of the velocity of movement of the beam spot 23. The differential tracking position is compared with the reference velocity by the velocity comparator 104 whose output represents a difference between the two and is integrated by the integrator 105; the result is outputted as a position error signal (PES). Based on the PES, the fine servo controller 12 and the fine actuator VCM driver 13 drive the fine actuator 3, and thereby the velocity control is performed so that the velocity of the beam spot 23 follows the reference velocity. The optical head 1 moves in the manner that it follows a position of the objective lens 24 so that the lens position error becomes zero as described above.

When the beam spot 23 reaches the target track, the microprocessor and logic 22 sets the seek/track following control line 200 to the track following state and the beam spot 23 becomes placed under the position control as previously described.

Figure 2:
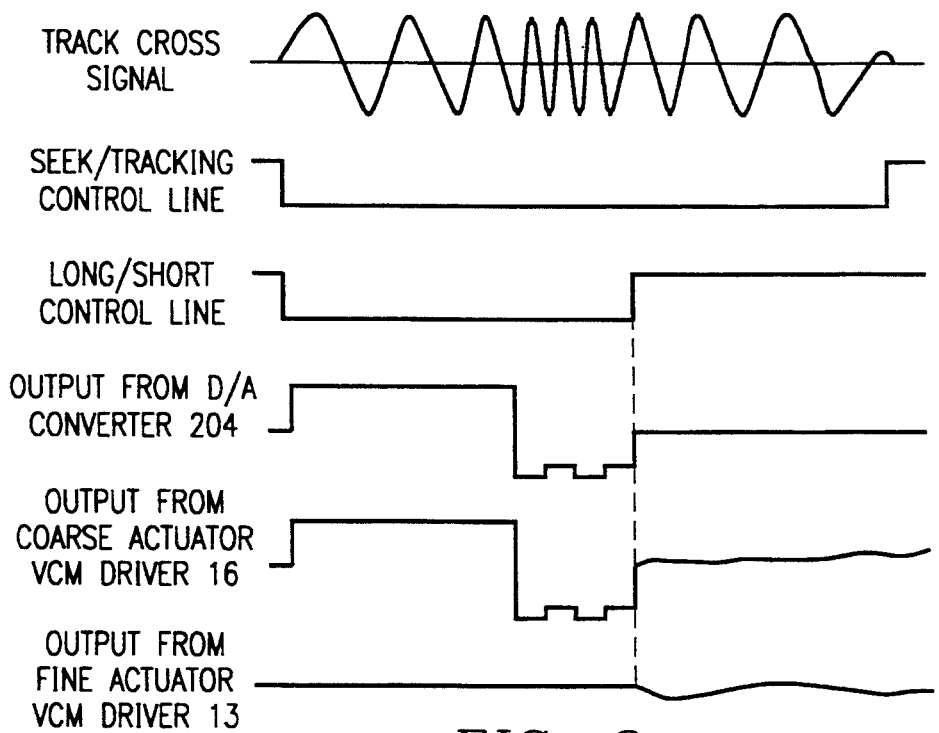
FIG. 2 shows the waveforms of various signals in the seek operation of the optical disk drive apparatus shown in FIG. 1.
Figure 9:
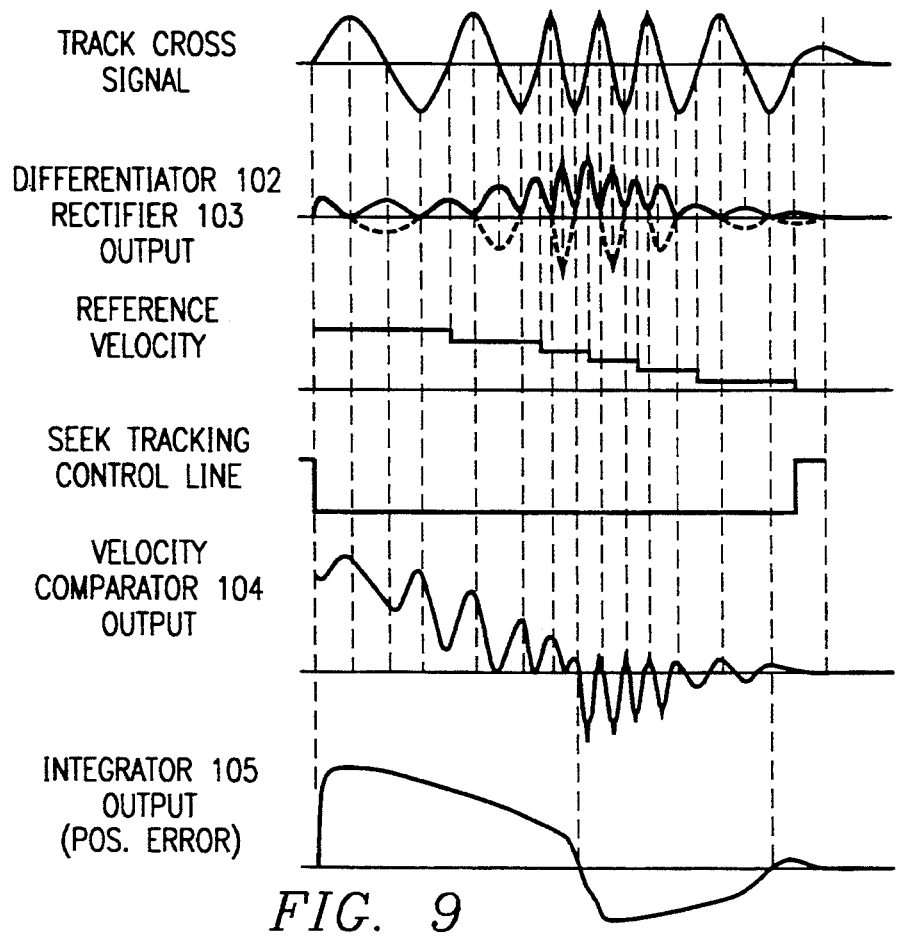
FIG. 9 is a diagram showing the operations of the section from the differentiator to the integrator.

Examples of the waveforms of various signals during the seek operation are shown in FIG. 2.

Figure 3:
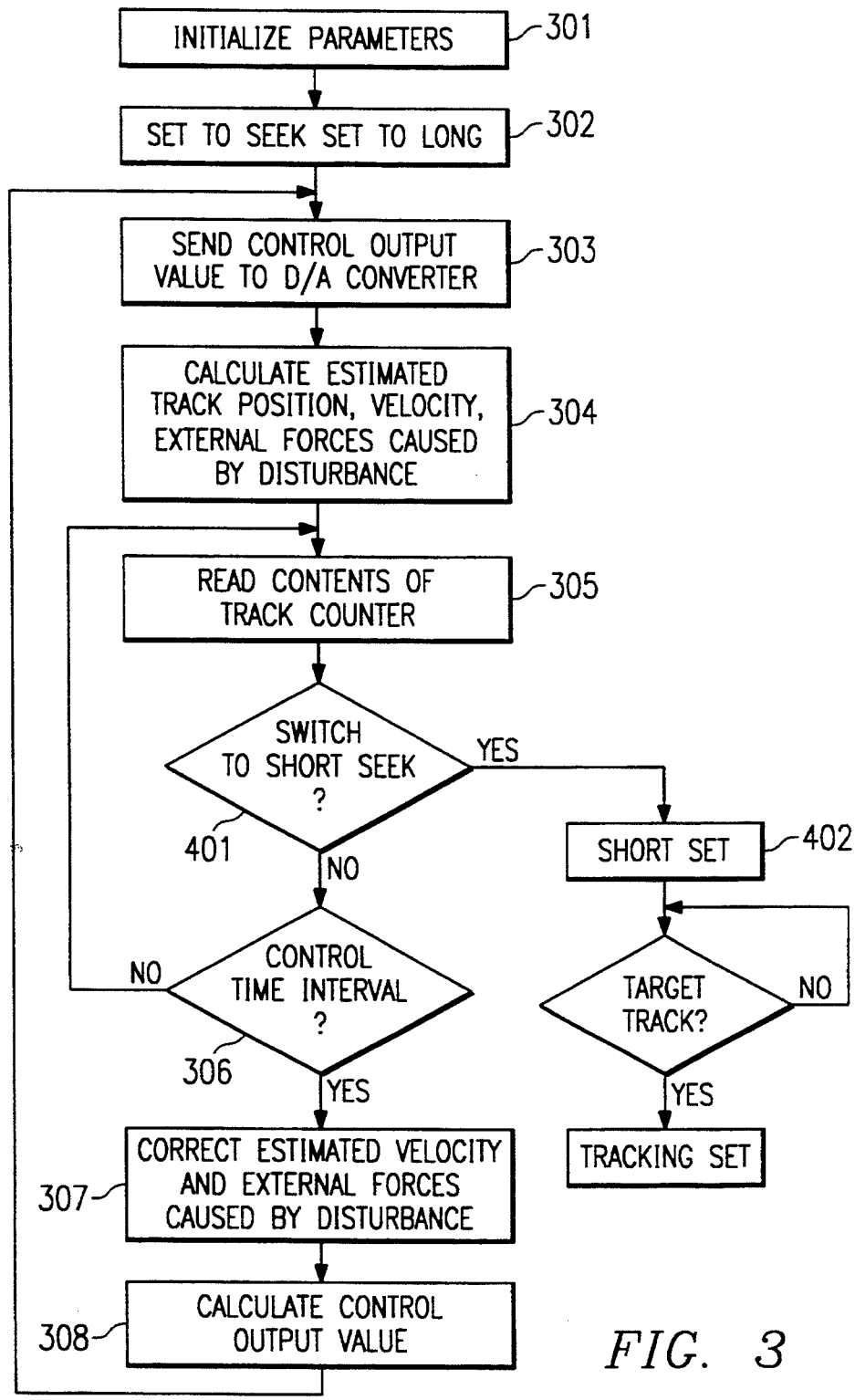
FIG. 3 is a flowchart showing steps of calculating a drive current of the coarse actuator by means of the microprocessor and logic of the embodiment according to the present invention.
Figure 4:
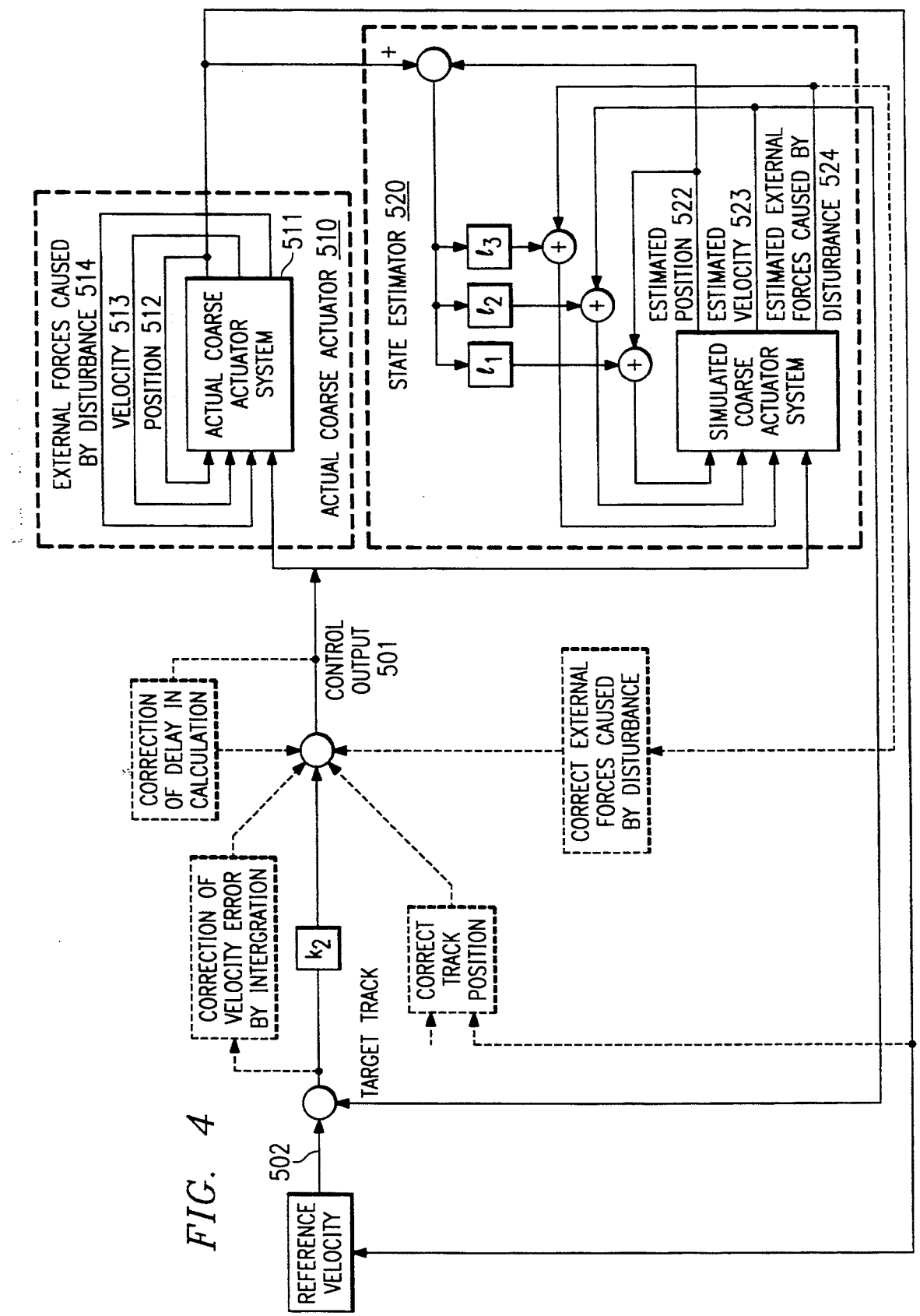
FIG. 4 is a diagram showing an example of a configuration for calculating a drive current of the coarse actuator by means of the microprocessor and logic of the embodiment according to the present invention.
Figure 5:
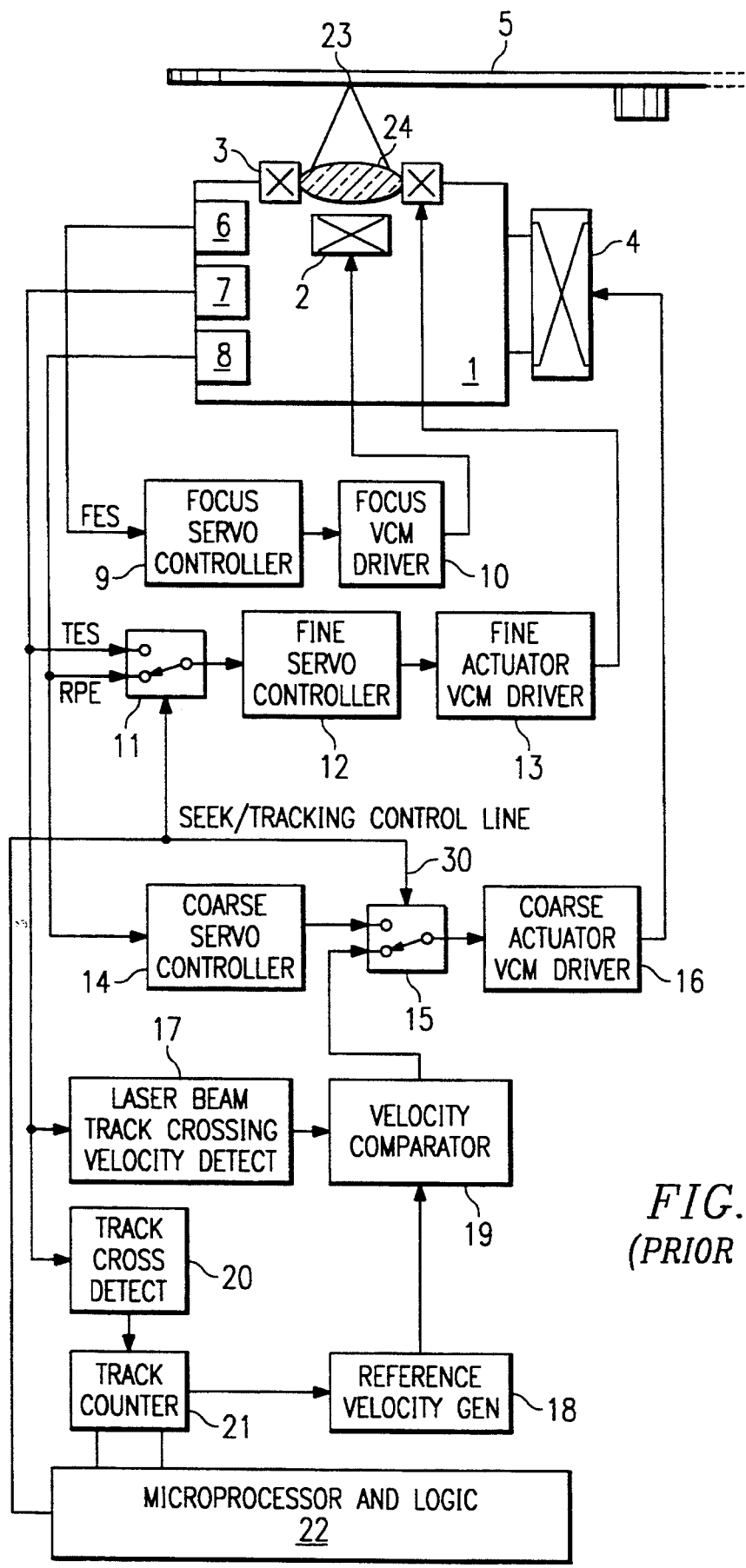
FIG. 5 is a diagram showing a first conventional method for the seek operation.
Figure 6:
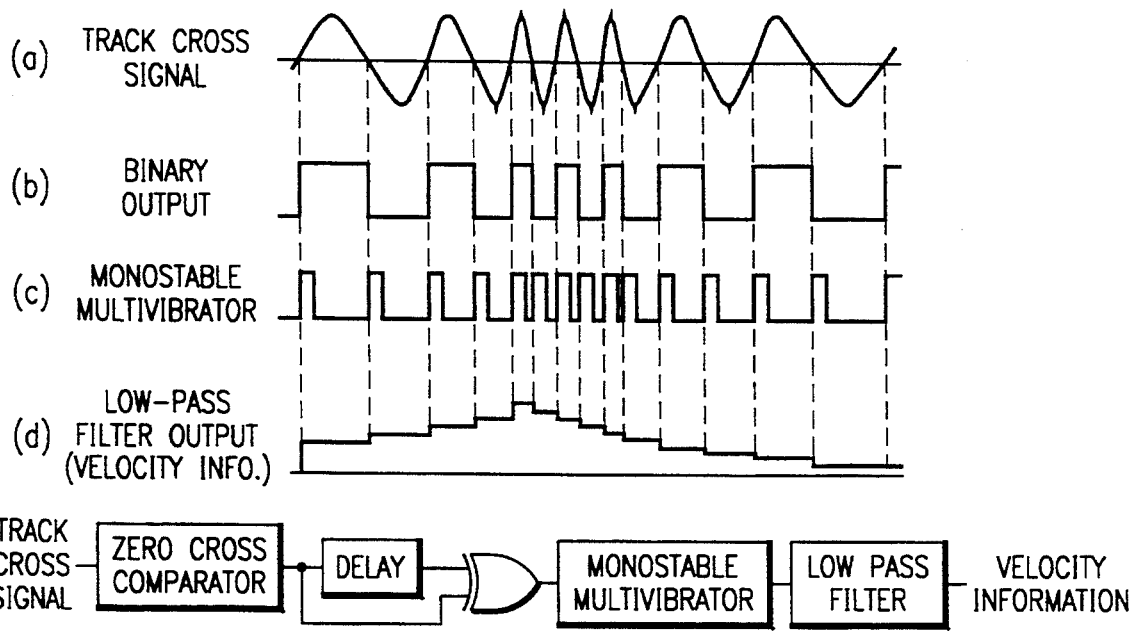
FIG. 6 shows an example of the configuration of the laser beam track crossing velocity detecting circuit in FIG. 5.
Figure 7:
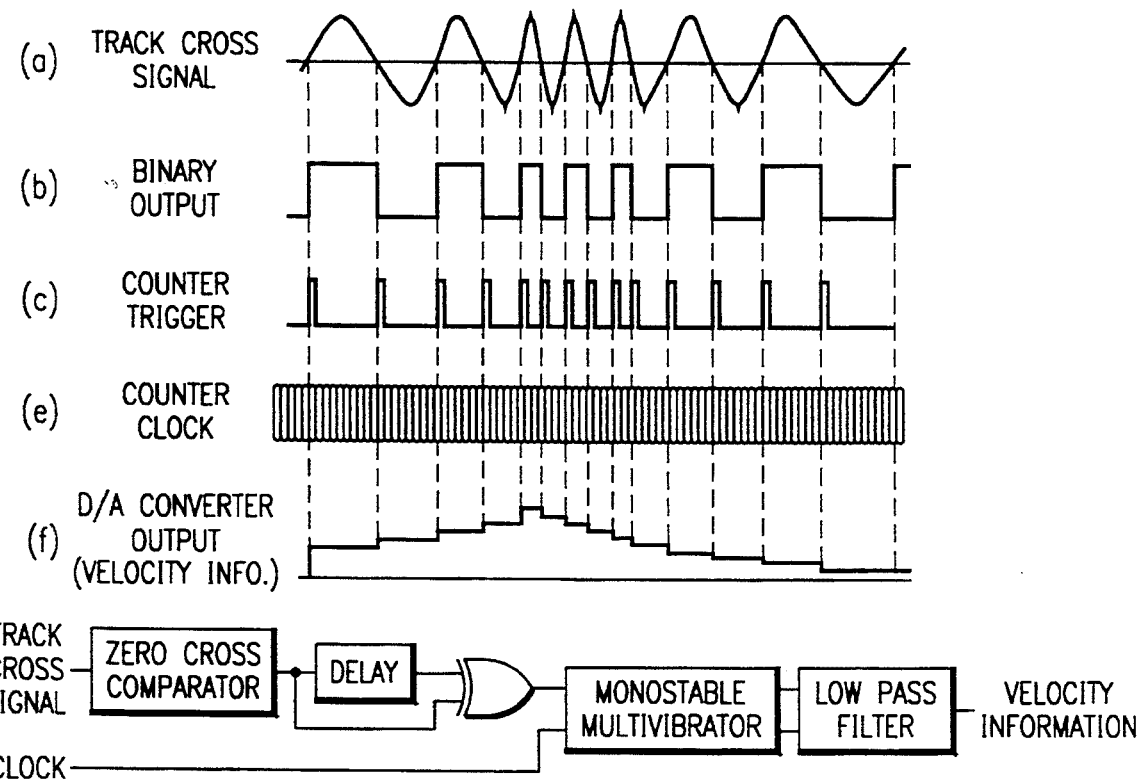
FIG. 7 shows another example of the configuration of the laser beam track crossing velocity detecting circuit in FIG. 5.
Figure 8:
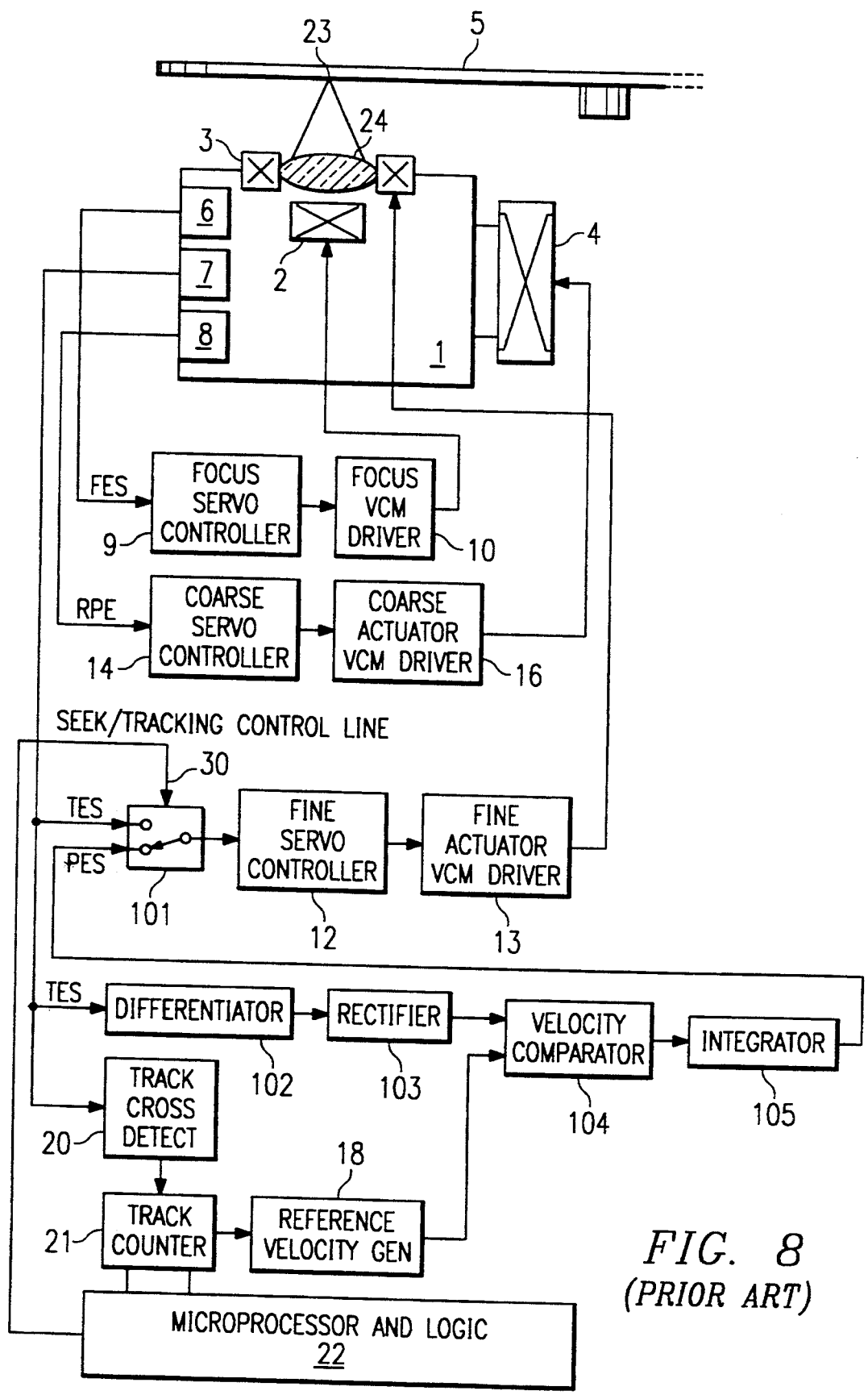
FIG. 8 is a diagram showing a second conventional method for the seek operation.

A method of calculating a drive current for the coarse actuator 4 by means of the microprocessor and logic 22 is described by reference to FIG. 3 and FIG. 4. The microprocessor and logic 22 first initializes parameters (Step 301). An initial value of a control output value corresponding to the drive current of the coarse actuator 4, that is, a value to be sent to the D/A converter 204, is a non-zero value to produce movement of the optical head 1 in the direction of the target track. Then the microprocessor and logic 22 sets the seek/track following control line 30 and the long/short seek control line 200 to the seek state and the long seek state, respectively, (Step 302) and outputs the control output value to the digital-to-analog converter 204 (Step 303). The microprocessor and logic 22 has means, such as a state estimator, for storing the theoretical characteristic of the coarse actuator 4. The track control output value is inputted to the state estimator along with a position of a target track to be encountered at the time of checking track positions. The velocity of the optical head and the magnitude of external forces caused by disturbances to the optical head in the seek direction at that time are calculated by estimation (Step 304). The microprocessor and logic 22 continues to read the contents of the track counter 21 until certain control time intervals elapse (Steps 305 and 306).

When the control time intervals have elapsed, the values of the estimated velocity and the magnitude of the external forces are corrected by using a difference between an actual position obtained from the most recent contents of the track counter 21 and the track position estimated by the above estimation (Step 307). The corrected estimated velocity value thus obtained is compared with a reference velocity associated with the number of remaining tracks, a control output value is calculated so that the difference between them decreases (Step 308), and then Step 303 is repeated. If the contents of the track counter 21 become smaller than the predetermined value, the calculation loop is terminated and the short seek state is set (Steps 401 and 402).

The above operations will now be described by reference to FIG. 4. In a block 510 corresponding to the actual coarse actuator 4, an actual coarse actuator system 511 generates an actual position signal 512 and an actual velocity signal 513, based on a control output 501. The actual coarse actuator system 511 also generates a signal representative of applied external forces 514 caused by disturbances to the optical head, not including force caused by a drive current for driving the coarse actuator. For example, where the optical disk drive apparatus is installed on a tilt, a gravity component in the driving direction of the actuator is one of the external forces.

The microprocessor and logic includes a state estimator 520; the control output 501 is inputted to a simulated coarse actuator system 521 of the state estimator 520. Thus, signals representative of an estimated position 522, an estimated velocity 523, and an estimated external forces 524 caused by disturbance can be obtained from the simulated coarse actuator system 521. If the actual coarse actuator system 511 is not different from the simulated coarse actuator system 521, including the external forces caused by disturbance, the estimated velocity 523 can be used for velocity control as an actual velocity. If the systems are different from each other, the estimated velocity 523 is different from the actual velocity 513. However, since the actual position 512 can be exactly obtained from the track counter, if the estimated velocity 523 and the estimated external forces 524 are corrected and fed back to the state estimator 520 based on a difference between the estimated position 522 and the actual position 512, the estimated velocity 523 can be determined as close to the actual velocity 513 as desired. The estimated velocity 523 thus obtained is compared 502 with the reference velocity associated with the number of remaining tracks, and the control output 501 is calculated so that a difference between them decreases. As described above, since the use of the number of remaining tracks retained in the track counter allows the simulated coarse actuator system 521 to approach the actual coarse actuator system 511 as much as possible, it becomes possible to precisely control the actual coarse actuator 510. Further, since the external forces caused by disturbance are taken into consideration in the present embodiment, more precise control becomes possible.

In the above mentioned embodiment, the velocity control sections of the coarse servo controller, the fine servo controller and the fine actuator were described as separate hardware. However, it will be appreciated that these sections may be controlled by a digital filter implemented by a high-speed arithmetic component, such as a digital signal processor or the like, or logic circuits, etc.

Further in the above mentioned embodiment, the control of the coarse actuator was switched immediately before the spot beam reached the target track to position following control based on the output of the lens position sensor. However it will be appreciated that even after the fine actuator is switched to the velocity control based on the TES (therefore PES), the velocity control of the coarse actuator may be continued based on the contents of the track counter. In this case, the switcher 201 is controlled by the seek/track following control line 30 rather than the long/short seek control line 200.

Still further in the above mentioned embodiment, an actuator configuration with the lens position sensor is employed. However, it will be appreciated also that even in control having a configuration in which a beam condenser is supported by spring-like materials and the neutral point of the condenser is maintained without the lens position sensor, a similar seek operation may be performed, based on filtering the output of the TES sensor or a drive current of the fine actuator, by controlling the coarse actuator.

Still yet further in the above mentioned embodiment, the long/short seek control line 200 was switched from one state to the other state based on the number of tracks remaining to be encountered until the target track is reached. However, it will be appreciated that this control can be performed by using a frequency of the TES or the velocity of the optical head 1 instead of the number of tracks. That is, means (not shown) for detecting the frequency of the TES can be provided to switch a state of the long/short seek control line 200 from one to the other and, in response to the switching, the frequency of the TES became smaller than a predetermined value during the deceleration of the optical head 1. Alternatively, means (not shown) for detecting the velocity of the optical head 1 can be provided to switch the state of the long/short seek control line 200 from one state to the other and, in response to the switching, the velocity of the optical head 1 became smaller than a predetermined value during the deceleration of the optical head 1. In those cases, in addition to the above detecting means, means are required for detecting whether the optical head 1 is decelerating (that is, means for determining the sign of the acceleration of movement of the optical head 1).

What is claimed is:

1. An optical disk drive apparatus comprising:

a coarse tracking actuator for driving an optical head;

a fine tracking actuator for driving an objective lens on said optical head;

tracking error detecting means for generating a tracking error signal indicating a positional difference between an optical spot irradiated on an optical disk and a target disk;

means for driving said coarse tracking actuator in the tracking direction based on the number of remaining tracks from the current track to the target track and for driving said fine tracking actuator in the tracking direction based on a relative position error signal if the number of remaining tracks is not smaller than a predetermined number; and means for driving said coarse tracking actuator in the tracking direction based on said relative position error signal and for driving said fine tracking actuator in the tracking direction under velocity control based on said tracking error signal if the number of remaining tracks is smaller than the predetermined number.

2. The optical disk drive apparatus of claim 1, further comprising:

a track counter for indicating the number of remaining tracks from the current track to the target track;

means for determining whether the number of remaining tracks indicated by said track counter is smaller than the predetermined number; and lens position detecting means for generating said relative position error signal indicating a position of said objective lens relative to said optical head.

3. The optical disk drive apparatus of claim 2, further comprising:

estimation means for estimating a position, a velocity, and external forces of said coarse tracking actuator;

means for providing a corrected estimated velocity and external forces of said coarse tracking actuator based on a difference between an actual position of said coarse tracking actuator, obtained from the number of remaining tracks indicated by said track counter, and an estimated position of said coarse tracking actuator, obtained from said estimation means; and means for driving said coarse tracking actuator in the tracking direction based on the corrected estimated velocity and external force.

4. The optical disk drive apparatus of claim 1, further comprising:

switching means, responsive to said tracking error signal, for outputting a switching signal; and means for driving said fine tracking actuator in the tracking direction under velocity control based on said tracking error signal in response to said switching signal from said switching means.

5. The optical disk drive apparatus of claim 4, wherein said switching means comprises means for outputting the switching signal when a frequency of said tracking error signal becomes smaller than a predetermined value during deceleration of said optical head.

6. The optical disk drive apparatus of claim 4, wherein said switching means comprises means for outputting the switching signal when a velocity represented by said tracking error signal becomes smaller than a predetermined value during deceleration of said optical head.

7. The optical disk drive apparatus according to claim 4, further comprising:

estimation means for estimating a position, a velocity, and external forces of said coarse tracking actuator;

means for providing corrected estimated velocity and external forces of said coarse tracking actuator based on a difference between an actual position of said coarse tracking actuator, obtained from the number of remaining tracks indicated by said track counter, and an estimated position of said coarse tracking actuator, obtained from said estimation means; and means for driving said coarse tracking actuator in the tracking direction based on the corrected estimated velocity and external force.

8. The optical disk drive apparatus of claim 1, further comprising means for integrating a difference between a current velocity derived from said tracking error signal and a reference velocity and for generating a value upon which velocity control of said fine tracking actuator is based.

9. An optical disk drive apparatus comprising:
a coarse tracking actuator for driving an optical head;
a fine tracking actuator for driving an objective lens on said optical head;
tracking error detecting means for generating a tracking error signal indicating a positional difference between an optical spot irradiated on an optical disk and a target track;
a track counter for indicating the number of remaining tracks from the current track to the target track;
means for determining whether the number of remaining tracks indicated by said track counter is smaller than a predetermined number;
lens position detecting means for generating a relative position error signal indicating a position of said objective lens relative to said optical head; and
means for driving said coarse tracking actuator in the tracking direction based on the number of remaining tracks indicated by said track counter and for driving said fine tracking actuator in the tracking direction based on said relative position error signal if the number of remaining tracks is not smaller than the predetermined number; and
means for driving said fine tracking actuator in the tracking direction under velocity control based on said tracking error signal and for driving said coarse tracking actuator in the tracking direction based on said relative position error signal if the number of remaining tracks is smaller than the predetermined number.

10. An optical disk drive apparatus comprising:
a coarse tracking actuator for driving an optical head;
a fine tracking actuator for driving for driving an objective lens on said optical head;
tracking error detecting means for generating a tracking error signal indicating a positional difference between an optical spot irradiated on an optical disk and a target track;
switching means, responsive to said tracking error signal, for outputting a switching signal; and
means for driving said coarse tracking actuator in the tracking direction based on a relative position error signal and for driving said fine tracking actuator in the tracking direction under velocity control based on said tracking error signal in response to said switching signal from said switching means being in a first state indicative of a short seek operation of said optical head;
means for driving said coarse tracking actuator in the tracking direction based on the number of remaining tracks from the current track to the target track and for driving said fine tracking actuator in the tracking direction based on a relative position error signal in response to said switching signal from said switching means being in a second state indicative of long seek operation of said optical head.

11. The optical disk drive apparatus of claim 10, wherein said switching means comprises means for outputting the switching signal in the first state when a frequency of said tracking error signal becomes smaller than a predetermined value during deceleration of said optical head.

12. The optical disk drive apparatus of claim 10, wherein said switching means comprises means for outputting the switching signal in the first state when a velocity represented by said tracking error signal becomes smaller than a predetermined value during deceleration of said optical head.

13. The optical disk drive apparatus according to claim 10, further comprising:
estimation means for estimating a position, a velocity, and external forces of said coarse tracking actuator;
means for providing a corrected an estimated velocity and external forces of said coarse tracking actuator based on a difference between an actual position of said coarse tracking actuator, obtained from the positional difference generated by said tracking error detecting means, and an estimated position of said coarse tracking actuator, obtained from said estimation means; and
means for driving said coarse tracking actuator in the tracking direction based on the corrected estimated velocity and external force.

* * * * *